UNITED STATES PATENT OFFICE.

RICHARD SUTPHEN, OF FREEHOLD, NEW JERSEY.

IMPROVEMENT IN WOOD-PRESERVING COMPOSITIONS.

Specification forming part of Letters Patent No. 120,009, dated October 17, 1871.

*To all whom it may concern:*

Be it known that I, RICHARD SUTPHEN, of Freehold, in the county of Monmouth and State of New Jersey, have invented an Improved Composition for Preserving Wood, of which the following is a specification:

This invention has relation to the seasoning and preservation of timber which is required to be set in the ground, such, for instance, as railroad ties, fence and telegraph-posts, and the like; and it consists in the application to such timber of a composition formed of asphaltum, coal-tar, resin, and Japan melted together in the proper proportions, and forming a homogenous mass, into which the timbers are dipped or the compound otherwise applied to them.

In order to form this preparation I take of the ingredients about the following proportions, viz.: Asphaltum, two quarts; coal-tar, one quart; resin, one ounce; Japan, one ounce.

I boil these together in a suitable vessel, and into the melted liquid dip the ends of the posts far enough to cover so much as is to set under ground, letting them remain for a short time, so that the liquid may penetrate the pores. When taken out the posts are well coated outside and seasoned inside, and perfectly impenetrable to water. Railroad ties may be coated all over.

Timber to which the above-mentioned preparation has been applied will last for a great length of time without decaying.

The preparation may be applied to the outside of the wood with a brush; but the most effectual way of seasoning it is to dip it in the boiling mass. The preparation becomes very hard after a short exposure to the air or when cool.

The proportions of ingredients admit of some variation, but are believed to be proper as specified.

Having described my invention, I claim—

1. The composition for preserving wood, consisting of asphaltum, coal-tar, resin, and Japan, substantially as described.

2. The combination of coal-tar, resin, and Japan to form a wood-preserving compound, substantially as and for the purpose specified.

In testimony that I claim the above I have hereunto subscribed my name in the presence of two witnesses.

RICHARD SUTPHEN.

Witnesses:
C. H. C. FLEMING,
W. D. OLIPHANT.

(35)